US009556338B2

(12) United States Patent
Jing et al.

(10) Patent No.: US 9,556,338 B2
(45) Date of Patent: Jan. 31, 2017

(54) SILICA COATING FOR ENHANCED HYDROPHILICITY/TRANSMITTIVITY (75) Inventors: Naiyong Jing, Woodbury, MN (US); Roxanne A. Boehmer, Inver Grove Heights, MN (US); Xue-hua Chen, Shanghai (CN); Zhigang Yu, Shanghai (CN); Ying Zhang, Shanghai (CN); Dang Xie, Shanghai (CN); Bangwei Xi, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 807 days.

(21) Appl. No.: 12/988,663

(22) PCT Filed: May 14, 2009

(86) PCT No.: PCT/US2009/043934
§ 371 (c)(1),
(2), (4) Date: Oct. 20, 2010

(87) PCT Pub. No.: WO2009/140482
PCT Pub. Date: Nov. 19, 2009

(65) Prior Publication Data
US 2011/0033694 A1   Feb. 10, 2011

(30) Foreign Application Priority Data
May 16, 2008 (CN) .......................... 2008 1 0099062

(51) Int. Cl.
B05D 3/02       (2006.01)
C09D 1/00       (2006.01)
(Continued)

(52) U.S. Cl.
CPC ............... *C09D 1/00* (2013.01); *C03C 17/007* (2013.01); *C04B 41/009* (2013.01);
(Continued)

(58) Field of Classification Search
CPC ....................................................... C09D 1/00
(Continued)

(56) References Cited

U.S. PATENT DOCUMENTS 2,366,516 A    1/1945   Geffcken et al.
2,432,484 A    12/1947  Moulton
(Continued)

FOREIGN PATENT DOCUMENTS

EP    0 145 308    6/1985
EP    0 263 428    4/1988
(Continued)

OTHER PUBLICATIONS

Arkles, Hydrophobicity, Hydrophilicity, and Silanes, Paint and Coatings Industry, Oct. 2006, p. 1-10.*
(Continued)

*Primary Examiner* — Tabatha Penny
(74) *Attorney, Agent, or Firm* — Kent S. Kokko (57) ABSTRACT A method of coating with an aqueous coating composition having a pH <5 of silica nanoparticles having a, average particle diameter of ≤40 nm, silica nanoparticles having an average particle diameter of ≥50 nm, and a tetraalkoxysilane. The resulting coatings are substantially uniform in thickness, durably adheres to the substrate, and provides antireflection and or hydrophilic surface properties to the substrate.

10 Claims, 4 Drawing Sheets (51) Int. Cl.
*C03C 17/00* (2006.01)
*C04B 41/00* (2006.01)
*C04B 41/50* (2006.01)
*C04B 41/85* (2006.01)
*C09D 7/12* (2006.01)
*C04B 111/00* (2006.01)
*C08K 3/36* (2006.01)

(52) U.S. Cl.
CPC .......... *C04B 41/5089* (2013.01); *C04B 41/85* (2013.01); *C09D 7/1216* (2013.01); *C09D 7/1266* (2013.01); *C03C 2217/425* (2013.01); *C03C 2217/75* (2013.01); *C04B 2111/00112* (2013.01); *C08K 3/36* (2013.01); *Y10T 428/259* (2015.01)

(58) Field of Classification Search
USPC ...................................................... 427/397.7
See application file for complete search history.

(56) References Cited

U.S. PATENT DOCUMENTS

| | | | |
|---|---|---|---|
| 2,536,764 A | 1/1951 | Moulton | |
| 2,601,123 A | 6/1952 | Moulton | |
| 2,801,185 A | 7/1957 | Iler | |
| 2,803,552 A | 8/1957 | Stedman | |
| 3,075,228 A | 1/1963 | Elias | |
| 3,819,522 A | 6/1974 | Zmoda et al. | |
| 3,986,997 A * | 10/1976 | Clark | 524/300 |
| 4,027,073 A | 5/1977 | Clark | |
| 4,275,118 A | 6/1981 | Baney | |
| 4,467,073 A | 8/1984 | Creasy | |
| 4,522,958 A | 6/1985 | Das et al. | |
| 4,816,333 A | 3/1989 | Lange et al. | |
| 4,944,294 A | 7/1990 | Borek, Jr. | |
| 5,204,219 A | 4/1993 | Van Ooij | |
| 5,221,497 A | 6/1993 | Watanabe et al. | |
| 5,286,782 A | 2/1994 | Lamb et al. | |
| 5,354,797 A | 10/1994 | Anderson et al. | |
| 5,464,900 A | 11/1995 | Stofko et al. | |
| 5,585,186 A | 12/1996 | Scholz et al. | |
| 5,597,512 A | 1/1997 | Watanabe et al. | |
| 5,639,546 A | 6/1997 | Bilkadi | |
| 5,723,175 A | 3/1998 | Scholz et al. | |
| 5,753,373 A | 5/1998 | Scholz et al. | |
| 5,756,226 A | 5/1998 | Valentini et al. | |
| 5,820,978 A | 10/1998 | Huang | |
| 5,922,299 A | 7/1999 | Bruinsma et al. | |
| 5,989,515 A | 11/1999 | Watanabe et al. | |
| 5,997,621 A | 12/1999 | Scholz et al. | |
| 6,013,724 A | 1/2000 | Mizutani et al. | |
| 6,040,053 A | 3/2000 | Scholz et al. | |
| 6,096,469 A | 8/2000 | Anderson et al. | |
| 6,165,256 A | 12/2000 | Hayakawa | |
| 6,251,523 B1 | 6/2001 | Takahashi et al. | |
| 6,258,969 B1 | 7/2001 | Sawai et al. | |
| 6,291,535 B1 | 9/2001 | Watanabe et al. | |
| 6,420,039 B1 * | 7/2002 | Field et al. | 428/451 |
| 6,428,898 B1 | 8/2002 | Barsotti et al. | |
| 6,544,593 B1 | 4/2003 | Nagata et al. | |
| 6,599,976 B2 | 7/2003 | Kobayashi et al. | |
| 6,605,683 B1 | 8/2003 | Zhang | |
| 6,767,984 B2 | 7/2004 | Toui | |
| 6,797,391 B2 | 9/2004 | Shibato et al. | |
| 6,918,957 B2 | 7/2005 | Kursawe et al. | |
| 7,066,998 B2 | 6/2006 | Rohrbaugh et al. | |
| 2001/0036547 A1 * | 11/2001 | Yamazaki et al. | 428/336 |
| 2001/0051213 A1 | 12/2001 | Schulz et al. | |
| 2004/0068035 A1 | 4/2004 | Paiva et al. | |
| 2005/0158566 A1 * | 7/2005 | Higuchi et al. | 428/447 |
| 2005/0233135 A1 | 10/2005 | Iyer et al. | |
| 2005/0266248 A1 | 12/2005 | Millero | |
| 2006/0062923 A1 | 3/2006 | Dilley et al. | |
| 2006/0093786 A1 | 5/2006 | Ohashi et al. | |
| 2006/0204655 A1 | 9/2006 | Takahashi et al. | |
| 2006/0269724 A1 | 11/2006 | Ohashi et al. | |
| 2007/0051274 A1 | 3/2007 | Saito et al. | |
| 2007/0104922 A1 | 5/2007 | Zhai et al. | |
| 2008/0057187 A1 | 3/2008 | Trapp et al. | |
| 2008/0124539 A1 | 5/2008 | Kawai et al. | |
| 2009/0025727 A1 | 1/2009 | Klun et al. | |

FOREIGN PATENT DOCUMENTS

| | | |
|---|---|---|
| EP | 0 424 006 | 4/1991 |
| EP | 0 570 165 | 11/1993 |
| EP | 0 372 756 | 12/1996 |
| EP | 1 132 448 | 9/2001 |
| GB | 1 454 960 | 11/1976 |
| GB | 2 041 956 | 9/1980 |
| GB | 2 137 648 | 10/1984 |
| JP | 05163463 | 6/1993 |
| JP | 2004083846 | 3/2004 |
| JP | 2006-124667 | 5/2006 |
| JP | 2007-138144 | 6/2007 |
| WO | WO 96/18691 | 6/1996 |
| WO | WO 2009/140482 | 11/2009 |

OTHER PUBLICATIONS

Bragg, et al., "The Form Birefringence of Macromolecules," Acta Crystallographica, vol. 6, p. 865-867, (1953).
Masso, "Evaluation of Scratch Resistant and Anti-reflective Coatings for Plastic Lenses," Annual Technical Conference Proceedings—Society of Vacuum Coaters, (1989), $32^{nd}$, pp. 237-240.
Iler, "The Chemistry of Silica—Solubility, Polymerization, Colloid and Surface Properties, and Biochemistry," John Wiley & Sons, p. 665, 1979.
ASTM Test Method D1003-92, entitled, "Standard Test Method for Haze and Luminous Transmittance of Transparent Plastics," pp. 220-224.
Shang et al., "Optically transparent superhydrophobic silica-based films," Thin Solid Films, vol. 427, pp. 37-43, Jan. 24, 2005.
Nissan Chemical SNOWTEX® product literature download from http://www.nissanchem-usa.com/snowtex.php on Jul. 1, 2010.
Ion Exchange Chemistry and Operation downloaded from http://www.remco.com/ix.htm on Jul. 1, 2010, pp. 1-9.
Zhang, Zuyi, "Catalytic Effect of Aluminum Acetylacetonate on Hydrolysis and Polymerization of Methyltrimethoxysilane," Langmuir, vol. 13, pp. 473-476, 1997.
Plueddemann, Edwin, "Silane Coupling Agents," Pleunum Press: New York, p. 20, 1982.
Snowtex product literature, 2007, downloaded from http://www.nissanchem-usa.com/snowtex.php.

\* cited by examiner

SILICA COATING FOR ENHANCED HYDROPHILICITY/TRANSMITTIVITY

CROSS REFERENCE TO RELATED APPLICATIONS

This application is a national stage filing under 35 U.S.C. 371 of PCT/US2009/043934, filed May 14, 2009, which claims priority to Chinese Application No. 200810099062.7, filed May 16, 2008, the disclosure of which is incorporated by reference in its/theeir entirety herein.

FIELD OF THE INVENTION

The present invention relates to silica nanoparticle coatings, articles, such as optical devices or graphic media, bearing nanoparticle silica coatings thereon, and to processes for preparing such articles.

BACKGROUND

Articles having surfaces capable of spreading water, and thus preventing the formation of water droplets on the surface of the article, are desirable for a variety of uses. For example, transparent plastics used in misty or humid environments, such as windows of greenhouses, should avoid the formation of light-reflecting water droplets which reduce light transmission. A water-spreading surface on these materials helps to maintain their transparency and minimizes undesirable streaking.

Water-spreading characteristics are also desirable on traffic signs that employ retroreflective sheeting. Retroreflective sheeting has the ability to return substantial quantities of incident light back towards the light source. Such light transmission into and back from a retroreflective sheeting is impaired by clinging raindrops and/or dew.

A prominent form of precipitation that affects light transmission is dew formation. Dew can be particularly problematic because it occurs predominantly at nighttime when the retroreflective sheeting is operative. When present on a traffic sign in the form of small beaded water droplets, dew can disrupt the path of incident and retroreflective light. This can make information on the sign very much more difficult for passing motorists to read. In contrast, when the dew is spread out smoothly as a transparent layer over the surface of the retroreflective traffic sign, the information on the sign is easier to read because the resulting thin smooth layer of water does not significantly misdirect the path of incident and retroreflective light to as great an extent.

A problem with water-spreading surface coatings, especially silica-based coatings, is the highly complex nature of the surface chemistry, reaction chemistry and solution chemistry of colloidal silica and colloidal silica films. For example, the interaction of ions with the silica surface is not fully understood despite extensive study (See Iler, "The Chemistry of Silica," John Wiley, 1979 p. 665.) Despite such difficulties, a silica-based water-spreading film that has enhanced durability is provided in accordance with the invention described below.

SUMMARY

The present disclosure is directed to a coating composition comprising a dispersion containing silica nanoparticles having an average primary particle size of 40 nanometers or less and an acid having a pKa of <3.5, and a method for coating a substrate comprising coating a substrate with the coating composition, and drying the coating.

The present disclosure further provides a coated article comprising a substrate, particularly a polymeric substrate, having a silica nanoparticle coating thereon. The coating comprises a continuous coating of agglomerated silica nanoparticles which have an average primary particle size of 40 nanometers or less. The coating is substantially uniform in thickness and is durably adhered to the substrate.

The coating adheres very well to a variety of substrates, particularly polymeric substrates, and can provide such substrates with excellent average reduction in specular reflectance, e.g., at least two percent. When the substrate is transparent, the coating can provide an average increase in transmissivity of normal incident light in the wavelength range of 400 to 700 nm over the transmission through an uncoated substrate of the same material. The increase in transmission is preferably at least two percent and up to as much as ten percent or more. As used herein "transparent" means a transmitting at least 85% of incident light in a selected portion of the visible spectrum (about 400-700 nm wavelength). Transparency into the UV region and the near IR region may also increase. For any chosen wavelength of light, there will be an optimal thickness for the antireflection layer.

The coating may further provide a hydrophilic surface to the substrate and is particularly useful in providing a hydrophilic surface to hydrophobic polymer substrates. The coating may also provide antifogging properties, and antistatic properties to polymeric film and sheet materials subject to static build-up. The coating may also preferably provide abrasion resistance and slip properties to polymeric materials, such as film and sheet materials, thereby improving their handleability.

Coatings that resulted from these acidified nanoparticle compositions may further provide a water-resistant and mechanically durable hydrophilic surface to a surface, such as glass and PET substrates, and good antifogging properties under a variety of temperature and high humidity conditions. Furthermore, the coatings may provide protective layers and exhibit rinse-away removal of organic contaminates including food and machine oils, paints, dust and dirt, as the nanoporous structure of the coatings tends to prevent penetration by oligomeric and polymeric molecules.

The method of the invention does not require solvent or surfactants for coating on substrates, and therefore are less hazardous and add no volatile organic compounds (VOCs) to the air. Other advantages include more uniform coatings, better adhesion to substrates, better durability of the coating, higher antireflection and increased transmissivity, and provide an easy to clean surface where contaminant may be rinsed away.

DETAILED DESCRIPTION

The present disclosure provides a method for coating a substrate comprising coating a substrate with a solution containing an acid having a pKa ($H_2O$) of ≤3.5, preferably <2.5, most preferably less than 1, and silica nanoparticles having an average primary particle size of 40 nanometers or less, and drying the coating.

Unexpectedly, these s silica nanoparticle coating compositions, when acidified, could be coated directly onto hydrophobic organic and inorganic substrates without either organic solvents or surfactants. The wetting property of these inorganic nanoparticle aqueous dispersions on hydrophobic surfaces such as polyethylene terephthalate (PET) or polycarbonate (PC) is a function of the pH of the dispersions and the pKa of the acid. The coating compositions are coatable on hydrophobic organic substrates when they are acidified with HCl to pH=2 to 3, and even to 5 in some embodiments. In contrast, the coating compositions bead up on the organic substrates at neutral or basic pH.

Not wishing to bound by theory, it is believed that the agglomerates of the silica nanoparticles are formed by through acid-catalyzed siloxane bonding in combination with protonated silanol groups at the nanoparticle surfaces and these agglomerates explain the coatability on hydrophobic organic surfaces, as these groups tend to be bonded, adsorbed, or otherwise durably attached to hydrophobic surfaces.

Although aqueous organic solvent based coatings of nanoparticle silica dispersions have been described, such mixtures of water and an organic solvents typically suffer from differential evaporation rates that result in continuously changing composition of the liquid phase, which consequently changes the coating properties; resulting in poor uniformity and defects. Although surfactants may help the wetting property of dispersions, they interfere with interparticular and interfacial substrate adhesion, and often produce nonuniform and defect-containing coatings.

Light-scattering measurements on these acidified dispersion solutions indicate that these silica nanoparticles do tend to agglomerate, providing (after coating and drying) three-dimensional porous networks of silica nanoparticles where each nanoparticle appears to be firmly bonded to adjacent nanoparticles. Micrographs reveal such bonds as silica "necks" between adjacent particles which are created by the acid in the absence of silica sources such as tetraalkoxysilanes. Their formation is attributed to the catalytic action of strong acid in making and breaking siloxane bonds. Surprisingly, the acidified dispersions appear to be stable when the pH is in the range 2 to 4. Light-scattering measurements showed that these agglomerated, acidified 5 nm or 4 nm silica nanoparticles at pH=2 to 3 and at 10 wt % concentration retained the same size after more than a week or even more than a month. Such acidified silica nanoparticle dispersions would be expected to remain stable even much longer at lower dispersion concentrations.

The silica nanoparticles used in this composition are dispersions of submicron size silica nanoparticles in an aqueous or in a water/organic solvent mixture and having and average primary particle diameter of 40 nanometers or less, preferably 20 nanometers or less, and more preferably 10 nanometers or less. The average particle size may be determined using transmission electron microscopy. The silica nanoparticles are preferably not surface modified.

The smaller nanoparticles, those of 20 nanometers or less, generally provide better coatings, when acidified, without the need for additives such as tetralkoxysilanes, surfactants or organic solvents. Further, the nanoparticles generally have a surface area greater than about 150 m$^2$/gram, preferably greater than 200 m$^2$/gram, and more preferably greater than 400 m$^2$/gram. The particles preferably have narrow particle size distributions, that is, a polydispersity of 2.0 or less, preferably 1.5 or less. If desired, larger silica particles may be added, in amounts that do not deleteriously decrease the coatability of the composition on a selected substrate, and do not reduce the transmissivity and/or the hydrophilicity.

Inorganic silica sols in aqueous media are well known in the art and available commercially. Silica sols in water or water-alcohol solutions are available commercially under such trade names as LUDOX (manufactured by E.I. duPont de Nemours and Co., Inc., Wilmington, Del., USA), NYACOL (available from Nyacol Co., Ashland, Mass.) or NALCO (manufactured by Ondea Nalco Chemical Co., Oak Brook, Ill. USA). One useful silica sol is NALCO 2326 available as a silica sol with mean particle size of 5 nanometers, pH 10.5, and solid content 15% by weight. Other commercially available silica nanoparticles include "NALCO 1115" and "NALCO 1130," commercially available from NALCO Chemical Co., "Remasol SP30," commercially available from Remet Corp., and "LUDOX SM," commercially available from E. I. Du Pont de Nemours Co., Inc.

Non-aqueous silica sols (also called silica organosols) may also be used and are silica sol dispersions wherein the liquid phase is an organic solvent, or an aqueous organic solvent. In the practice of this invention, the silica sol is chosen so that its liquid phase is compatible with the emulsion, and is typically aqueous or an aqueous organic solvent. However, it has been observed that sodium stabilized silica nanoparticles should first be acidified prior to dilution with an organic solvent such as ethanol. Dilution prior to acidification may yield poor or non-uniform coatings. Ammonium stabilized silica nanoparticles may generally be diluted and acidified in any order.

If desired, larger silica particles may be added, in amounts that do not reduce to the transmissivity values and/or antifog properties. These additional silica particles generally have an average primary particle size of greater than 40 to 100 nanometers, preferably 50 to 100 nanometers, and may be used in ratios of 0.2:99.8 to 99.8:0.2, relative to the weight of the silica nanoparticles of less than 40 nanometers. Larger particles are preferably used in rations of 1:9 to 9:1. Generally the total weight of silica particles (i.e. the total of <40 nm and larger silica particles) in the composition is 0.1 to 40 wt. %, preferably 1 to 10 wt. %, most preferably 2 to 7 wt. %.

The coating composition contains an acid having a pKa ($H_2O$) of ≤3.5, preferably <2.5, most preferably less than 1. Useful acids include both organic and inorganic acids and may be exemplified by oxalic acid, citric acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3SO_2OH$. Most preferred acids include HCl, $HNO_3$, $H_2SO_4$, and $H_3PO_4$. In some embodiments, it is desirable to provide a mixture of an organic and inorganic acid. In some embodiments one may use a mixture of acids comprising those having a pKa≤3.5 (preferably<2.5, most preferably less than 1) and minor amounts of other acids having pKa's>0. It has been found that weaker acids having a pKa of >4, such as acetic acid, do not provide a uniform coatings having the desirable properties of transmissivity, cleanability and/or durability. In particular, coating compositions with weaker acids such as acetic acid typically bead up on the surface of a substrate.

The coating composition generally contains sufficient acid to provide a pH of less than 5, preferably less than 4, most preferably less than 3. In some embodiments, it has been found that the pH of the coating composition can be adjusted to pH 5-6 after reducing the pH to less than 5. This allows one to coat more pH sensitive substrates.

Tetraalkoxy coupling agents, such as tetraethylorthosilicate (TEOS) and oligomeric forms, such as alkyl polysilicates (e.g. poly(diethoxysiloxane)), may also be useful to improve binding between silica nanoparticles. The amount of coupling agent included in the coating composition should be limited in order to prevent destruction of the anti-reflective or anti-fog properties of the coating. The optimal amount of coupling agent is determined experimentally and is dependent on the coupling agent's identity, molecular weight and refractive index. The coupling agent(s), when present, are typically added to the composition at levels of 0.1 to 20 percent by weight of the silica nanoparticle concentration, and more preferably about 1 to 15 percent by weight of the silica nanoparticles.

The article of the disclosure is a substrate bearing a continuous network of silica nanoparticles agglomerates. The particles preferably have an average primary particle size of 40 nanometers or less. The average particle size may be determined using transmission electron microscopy. As used herein, the term "continuous" refers to covering the surface of the substrate with virtually no discontinuities or gaps in the areas where the gelled network is applied. The term "network" refers to an aggregation or agglomeration of nanoparticles linked together to form a porous three-dimensional network. The term "primary particle size" refers to the average size of unagglomerated single particles of silica.

Figure 1:
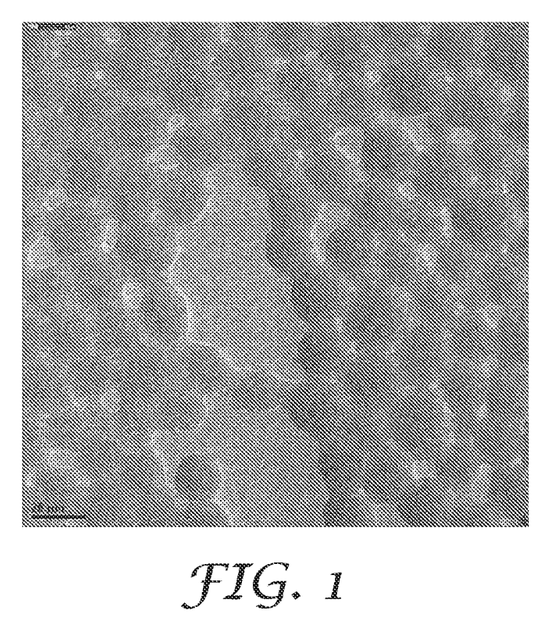
FIG. 1 is a transmission electron micrograph of an article prepared in Example 78.
Figure 2:
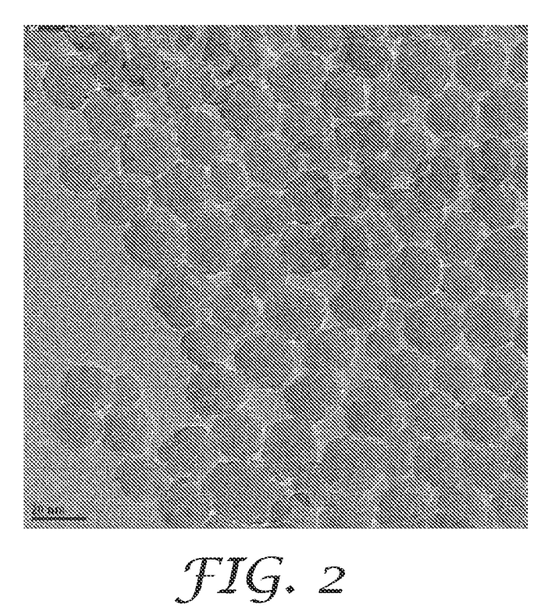
FIG. 2 is a transmission electron micrograph of an article of Comparative Example 77.

FIG. 1 shows a coated article of the invention from Example 78. As can be seen, the individual silica nanoparticles are linked to adjacent silica nanoparticles. The coating is uniform. In contrast, FIG. 2 shows a coating from ethanol at a basic pH. The coating is non-uniform and the individual particles are not linked to the adjacent particles.

The term "porous" refers to the presence of voids between the silica nanoparticles created when the nanoparticles form a continuous coating. For single layer coatings, it is known that in order to maximize light transmission in air through an optically transparent substrate, and minimize reflection by the substrate, the refractive index of the coating should equal as closely as possible the square root of the refractive index of the substrate and the thickness of the coating should be one-fourth (¼) of the optical wavelength of the incident light. The voids in the coating provide a multiplicity of subwavelength interstices between the silica nanoparticles where the index of refraction (RI) abruptly changes from that of air (RI=1) to that of the metal oxide particles (e.g., for silica RI=1.44). By adjusting the porosity, a coating having a calculated index of refraction (as shown in U.S. Pat. No. 4,816,333 (Lange, et al.) incorporated herein by reference) very close to the square root of the refractive index of the substrate can be created. By utilizing coatings having optimal indices of refraction, at coating thicknesses equal to approximately one-fourth the optical wavelength of the incident light, the percent transmission of light through the coated substrate is maximized and reflection is minimized.

Preferably, the network has a porosity of about 25 to 45 volume percent, more preferably about 30 to 40 volume percent, when dried. In some embodiments the porosity may be higher. Porosity may be calculated from the refractive index of the coating according to published procedures such as in W. L. Bragg, A. B. Pippard, Acta Crystallographica, volume 6, page 865 (1953) incorporated herein by reference. With silica nanoparticles, this porosity provides a coating having an index of refraction of 1.2 to 1.4, preferably 1.25 to 1.36, which is approximately equal to the square root of the refractive indices of polyester, polycarbonate, or poly (methyl methacrylate) substrates. For example, a porous silica nanoparticle coating having a refractive index of 1.25 to 1.36 is capable of providing a highly anti-reflective surface when coated on a polyethylene terephthalate substrate (RI=1.64) at a thickness of 1000-2000 Å. Coating layer thicknesses may be higher, as high as a few microns or mils thick, depending on the application, such as for easy-clean of removal of undesired particulates, rather than antireflection. The mechanical properties may be expected to be improved when the coating thickness is increased.

In some embodiments, articles of the invention comprise a substrate which may be of virtually any construction, transparent to opaque, polymeric, glass, ceramic, or metal, having a flat, curved, or complex shape and having formed thereon a continuous network of agglomerated silica nanoparticles. When the coating is applied to transparent substrates to achieve increased light transmissivity, the coated article preferably exhibits a total average increase in transmissivity of normal incident light of at least two percent and up to as much as ten percent or more, depending on the substrate coated, over a range of wavelengths extending at least between 400 to 700 nm. An increase in transmissivity may also be seen at wavelengths into the ultraviolet and/or infrared portion of the spectrum. Preferred coating compositions applied to at least one side of a light transmissive substrate increase the percent transmission of the substrate by at least 5 percent, and preferably by 10 percent, when measured at 550 nm The coating compositions of the present invention provide hydrophilicity to a substrate, useful in imparting anti-fog properties, in addition to anti-reflection, to substrates coated therewith. Coatings are considered anti-fogging if a coated substrate resists the formation of small, condensed water droplets in sufficient density to significantly reduce the transparency of the coated substrate such that it cannot be adequately seen through after exposure to repeated human breathing directly on the article and/or after holding the article above a "steam" jet. A coating composition may still be regarded as anti-fogging even though a uniform water film or a small number of large water droplets forms on the coated substrate so long as the transparency of the coated substrate is not significantly reduced such that it cannot be readily seen through. In many instances, a film of water that does not significantly reduce the transparency of the substrate will remain after the substrate has been exposed to a "steam" jet.

There are numerous instances where the value of optically clear articles would be enhanced if the tendency of the articles to cause light scattering or glare or to be obscured by the formation of a fog on a surface of the article could be reduced. For example, protective eyewear (goggles, face shields, helmets, etc.), ophthalmic lenses, architectural glazings, decorative glass frames, motor vehicle windows and windshields may all scatter light in a manner that causes an annoying and disruptive glare. Use of such articles may also be detrimentally affected by the formation of a moisture vapor fog on a surface of the article. Ideally, in preferred embodiments, the coated articles of this invention have exceptional anti-fog properties while also separately having greater than 90 percent transmission of 550 nm light.

The polymeric substrates may comprise polymeric sheet, film, or molded material. In some embodiments, where increased transmissivity is desired, the substrate is transparent. The term transparent means transmitting at least 85% of incident light in the visible spectrum (about 400-700 nm wavelength). Transparent substrates may be colored or colorless.

In other embodiments, where increased hydrophilicity is desired, the substrate may be initially hydrophobic. The compositions may be applied to a wide variety of substrates by a variety of coating methods. As used herein, "hydrophilic" is used only to refer to the surface characteristics of the thermoplastic polymer layer, i.e., that it is wet by aqueous solutions, and does not express whether or not the layer absorbs aqueous solutions. Accordingly, a thermoplastic polymer layer may be referred to as hydrophilic whether or not the layer is impermeable or permeable to aqueous solutions. Surfaces on which drops of water or aqueous solutions exhibit a static water contact angle of less than 50° are referred to as "hydrophilic". Hydrophobic substrates have a water contact angle of 50° or greater. Coatings described herein may increase the hydrophilicity of a substrate at least 10 degrees, preferably at least 20 degrees.

Substrates to which the coating compositions of the invention can be applied are preferably transparent or translucent to visible light. Preferred substrates are made of polyester (e.g., polyethylene terephthalate, polybutyleneterephthalate), polycarbonate, allyldiglycolcarbonate, polyacrylates, such as polymethylmethacrylate, polystyrene, polysulfone, polyethersulfone, homo-epoxy polymers, epoxy addition polymers with polydiamines, polydithiols, polyethylene copolymers, fluorinated surfaces, cellulose esters such as acetate and butyrate, glass, ceramic, organic and inorganic composite surfaces and the like, including blends and laminates thereof.

Typically the substrate is in the form of a film, sheet, panel or pane of material and may be a part of an article such as ophthalmic lenses, architectural glazings, decorative glass frames, motor vehicle windows and windshields, and protective eye wear, such as surgical masks and face shields. The coatings may, optionally if desired, cover only a portion of the article, e.g., only the section immediately adjacent the eyes in a face shield may be coated. The substrate may be flat, curved or shaped. The article to be coated may be produced by blowing, casting, extrusion, or injection molding.

Articles such as disposable surgical face masks and face shields which are coated with the anti-reflective, anti-fog compositions of this invention are preferably stored in single use packages which reduce environmental exposure and contamination which can result in decreased anti-fog properties. Reusable articles are preferably used in combination with a package that protects or completely seals the product from environmental exposure when not in use. The material used to form the packages should be comprised of a non-contaminating material. It has been found that certain materials can result in partial or total elimination of the anti-fog properties. While not being bound by any theory, it is currently believed that materials which contain plasticizers, catalysts, and other low molecular weight materials which can volatilize on aging are sorbed into the coating and result in a decrease in the anti-fog property.

Accordingly, the invention provides protective eyewear, such as surgical masks and face shields, as well as ophthalmic lenses, windows and windshields which have anti-reflective and anti-fog properties.

In other embodiments, the substrate need not be transparent. It has been found that the composition provides easily cleanable surfaces to substrates such as flexible films used in graphics and signage. Flexible films may be made from polyesters such as PET or polyolefins such as PP (polypropylene), PE (polyethylene) and PVC (polyvinyl chloride) are particularly preferred. The substrate can be formed into a film using conventional filmmaking techniques such as extrusion of the substrate resin into a film and optional uniaxial or biaxial orientation of the extruded film. The substrate can be treated to improve adhesion between the substrate and the hardcoat, using, e.g., chemical treatment, corona treatment such as air or nitrogen corona, plasma, flame, or actinic radiation. If desired, an optional tie layer can also be applied between the substrate and the coating composition to increase the interlayer adhesion. The other side of the substrate may also be treated using the above-described treatments to improve adhesion between the substrate and an adhesive. The substrate may be provided with graphics, such as words or symbols as known in the art.

In some embodiments the coating composition provides improved cleanability and provides a tough, abrasion resistant layer that protects the substrate and the underlying graphic display from damage from causes such as scratches, abrasion and solvents, and. By "cleanable" it is meant the coating composition, when cured, provides oil and soil resistance to help prevent the coated article from being soiled by exposure to contaminants such as oils or adventitious dirt. The coating composition can also make the hard coat easier to clean if it is soiled, so only a simple rinse in water is required to remove contaminants.

In order to uniformly coat the composition onto a hydrophobic substrate from an aqueous system it may be desirable to increase the surface energy of the substrate and/or reduce the surface tension of the coating composition. The surface energy may be increased by oxidizing the substrate surface prior to coating using corona discharge or flame treatment methods. These methods may also improve adhesion of the coating to the substrate. Other methods capable of increasing the surface energy of the article include the use of primers such as thin coatings of polyvinylidene chloride (PVDC). Alternatively, the surface tension of the coating composition may be decreased by addition of lower alcohols ($C_1$ to $C_8$). In some instances, however, in order to improve the coating hydrophilicity for desired properties and to ensure uniform coating of the article from an aqueous or hydroalcoholic solution, it may be beneficial to add a wetting agent, which is typically a surfactant.

The term "surfactant" as used herein describes molecules comprising hydrophilic (polar) and hydrophobic (non-polar) regions on the same molecule which are capable of reducing the surface tension of the coating solution. Useful surfactants may include those disclosed in U.S. Pat. No. 6,040,053 (Scholz et al.), incorporated herein by reference.

For typical concentrations of silica nanoparticles (e.g., about 0.2 to 15 percent by weight relative to the total coating composition) most surfactants comprise less than about 0.1 percent by weight of the coating composition, preferably between about 0.003 and 0.05 percent by weight, in order to preserve the anti-reflective properties of the coating. It should be noted that with some surfactants a spotty coating is attained at concentrations in excess of what is needed to achieve the anti-fog property.

Anionic surfactants in the coating composition are preferred when added to improve the uniformity of the resulting coatings. Useful anionic surfactants include, but are not limited to, those with molecular structures comprising (1) at least one hydrophobic moiety, such as from about $C_6$-to about $C_{20}$-alkyl, alkylaryl, and/or alkenyl groups, (2) at least one anionic group, such as sulfate, sulfonate, phosphate, polyoxyethylene sulfate, polyoxyethylene sulfonate, polyoxyethylene phosphate, and the like, and/or (3) the salts of such anionic groups, wherein said salts include alkali metal salts, ammonium salts, tertiary amino salts, and the like. Representative commercial examples of useful anionic surfactants include sodium lauryl sulfate, available under the trade name TEXAPON L-100 from Henkel Inc., Wilmington, Del., or under the trade name POLYSTEP B-3 from Stepan Chemical Co, Northfield, Ill.; sodium lauryl ether sulfate, available under the trade name POLYSTEP B-12 from Stepan Chemical Co., Northfield, Ill.; ammonium lauryl sulfate, available under the trade name STANDAPOL A from Henkel Inc., Wilmington, Del.; and sodium dodecyl benzene sulfonate, available under the trade name SIPONATE DS-10 from Rhone-Poulenc, Inc., Cranberry, N.J.

Where the coating composition does not include a surfactants or when improved coating uniformity is desirable, it may be beneficial to add another wetting agent, including those that do not impart durable anti-fog properties, in order to ensure uniform coating of the article from an aqueous or hydroalcoholic solution. Examples of useful wetting agents include polyethoxylated alkyl alcohols (e.g. "Brij™ 30," and "Brij™ 35," commercially available from ICI Americas, Inc., and "Tergitol™ TMN-6™ Specialty Surfactant," commercially available from Union Carbide Chemical and Plastics Co., polyethoxylated alkylphenols (e.g., "Triton™ X-100" from Union Carbide Chemical and Plastics Co., "Iconol™ NP-70" from BASF Corp.) and polyethylene glycol/polypropylene glycol block copolymer (commercially available as "Tetronic™ 1502 Block Copolymer Surfactant," "Tetronic™ 908 Block Copolymer Surfactant" and "Pluronic™ F38 Block Copolymer Surfactant," all from BASF, Corp.) Of course, any added wetting agent must be included at a level which will not destroy the anti-reflective or anti-fog properties of the coating. Generally the wetting agent is used in amounts of less than about 0.1 percent by weight of the coating composition, preferably between about 0.003 and 0.05 percent by weight of the coating composition depending on the amount of silica nanoparticles. Rinsing or steeping the coated article in water may be desirable to remove excess surfactant or wetting agent.

The compositions are preferably coated on the article using conventional techniques, such as bar, roll, curtain, rotogravure, spray, or dip coating techniques. The preferred methods include bar and roll coating, or air knife coating to adjust thickness. In order to ensure uniform coating and wetting of the film, it may be desirable to oxidize the substrate surface prior to coating using corona discharge or flame treatment methods. Other methods capable of increasing the surface energy of the article include the use of primers such as polyvinylidene chloride (PVDC).

The coatings of the present invention are preferably applied in uniform average thicknesses varying by less than about 200 Å, and more preferably by less than 100 Å, in order to avoid visible interference color variations in the coating. The optimal average dry coating thickness is dependent upon the particular coating composition, but in general the average thickness of the coating is between 500 and 2500 Å, preferably 750 to 2000 Å, and more preferably 1000 to 1500 Å, as measured using an ellipsometer such as a Gaertner Scientific Corp Model No. L115C. Above and below this range, the anti-reflective properties of the coating may be significantly diminished. It should be noted, however, that while the average coating thickness is preferably uniform, the actual coating thickness can vary considerably from one particular point on the coating to another. Such variation in thickness, when correlated over a visibly distinct region, may actually be beneficial by contributing to the broad band anti-reflective properties of the coating.

The coatings of the present invention are preferably coated on both sides of the substrate. Alternatively, the coatings of the present invention may be coated on one side of the substrate. The opposite side of the substrate may be uncoated, coated with a conventional surfactant or polymeric anti-fogging composition such as that disclosed in U.S. Pat. Nos. 2,803,552; 3,075,228; 3,819,522; 4,467,073; or 4,944,294 (all of which are incorporated herein by reference), or coated with an anti-reflective composition, such as that disclosed in U.S. Pat. No. 4,816,333, or the multiple layered coating described by J. D. Masso in "Evaluation of Scratch Resistant and Anti-reflective Coatings for Plastic Lenses," (supra), both of which are incorporated herein by reference. Preferably, the antifog coating surface should face the direction of higher humidity, e.g., on a face shield the side having the anti-fog coating should face the wearer. The opposite side may bear a transparent resilient and/or tough coating to resist abrasion by particles, and/or shattering from a blow.

Once coated, the article is typically dried at temperatures of between 20 and 150° C. in a recirculating oven. An inert gas may be circulated. The temperature may be increased further to speed the drying process, but care must be exercised to avoid damage to the substrate. After the coating composition is applied to the substrate and dried, the coating comprises preferably from about 60 to 95 percent by weight (more preferably from about 70 to 92 percent by weight) of silica nanoparticles (typically agglomerated), from about 0.1 to 20 percent by weight percent by weight (more preferably from about 10 to 25 percent by weight) tetralkoxysilanes and optionally about 0 to 5 percent by weight (more preferably from about 0.5 to 2 percent by weight) surfactant, and up to about 5 percent by weight (preferably 0.1 to 2 percent by weight) wetting agent.

When the coating compositions of the invention are applied to substrates to provide anti-reflection properties, glare is reduced by increasing the light transmission of the coated substrate. Preferably, the coated substrate exhibits an increase in transmission of normal incident light of at least 3 percentage points and up to as much as 10 percentage points or more, when compared to an uncoated substrate, at 550 mm (e.g., the wavelength at which the human eye displays peak photo-optic response). The percent transmission is dependent upon the angle of incidence and the wavelength of light and is determined using ASTM test method D1003-92, entitled "Haze and Luminous Transmittance of Transparent Plastics," incorporated herein by reference. Preferably, the coated substrates display an increase in percent transmission of greater than 3 percent, more preferably greater than 5 percent, and most preferably greater than 8 percent when compared with an uncoated substrate, using 550 nm light. When the desired usage involves significant "off-axis" (i.e. non-normal) viewing or unwanted reflections, gains in visibility may be greater especially where the reflections approach or exceed in brightness the object in view.

The coating compositions of the invention, as discussed hereinabove, provide anti-fog as well as anti-reflective properties to surfaces coated therewith. The anti-fog property is demonstrated by the tendency of the coatings to resist the formation of water droplets which tend to significantly reduce the transparency of the coated substrate. Water vapor from, for example, human breathing, tends to condense upon the coated substrate in the form of a thin uniform water film, rather than as water droplets. Such a uniform film does not significantly reduce the clarity or transparency of the substrate.

In many embodiments, the coating compositions of the present invention are shelf stable, e.g., they do not gel, opacify, or otherwise deteriorate significantly. Further, in many embodiments, the coated articles are durable and abrasion resistant, using the test method described herein.

EXAMPLES

Materials

Silica nanoparticle dispersions available from the Nalco Company, Naperville, Ill. as Nalco 1115™ (4 nm), 2326™ (5 nm), 1030™ (13 nm), 1050™ (20 nm), 2327™ (20 nm), 45 nm and 93 nm.

Tetraethoxysilane (TEOS, 99.9%) was obtained from Alfa Aesar, Ward Hill, Mass.

Polyethylene terephthalate (PET) film was obtained from E.I DuPont de Nemours, Wilmington, Del. under the trade designation "Melinex 618", and having a thickness of 5.0 mils and a primed surface.

Polycarbonate (PC) film is available under the tradenames LEXAN 8010 (0.381-mm), 8010SHC (1.0-mm) and OQ92 from GE Advanced Materials Specialty Film and Sheet, Pittsfield, Mass.)

Bynel-3101™ is a polyethylene copolymer commercially available from E. I. DuPont de Nemours & Co., Wilmington, Del.

Pellathene 2363™ is polyether-based polyurethane, available from Dow Chemical, Midland Mich.

Polyvinyl chloride (PVC) film was 3M™ Scotchcal™ Luster Overlaminate 8519, 1.25 mil, available from the 3M Company, St. Paul, Minn.

PFPE on PC (Example 84) refers to a polycarbonate substrate having a perfluoropolyether coating thereon, prepared according to Example 1 of Ser. No. 11/828,566 (Klun et al, incorporated herein by reference), using as the top coating a solution of SHC-1200 containing 0.5 weight percent of Preparation 2

Sample Preparation:

Silica nanoparticle dispersions (of the sizes indicated in the Examples) were diluted to 5 wt % with deionized water and acidified with concentrated aqueous HCl to the indicated pH (generally 2-3). For some Examples, the acidified silica nanoparticle dispersions (5 wt %) were mixed with TEOS or organic solvents in ratios described in the Tables.

The indicated substrates were coated using a blocked coater or a Meyer bar with a 1 mil gap and 5 wt % silica dispersions (total silica weight), providing a dry coating thickness in a range of 100-200 nm. The coated samples were heated to 80-100° C. for 5 min to 10 min to effect drying.

Transmissivity

Transmission and reflectance measurements were performed using a Varian Cary 5E spectrophotometer at a relative humidity of 20%. Atomic Force Microscopy (AFM) heights and phase images were collected using Nanoscope IIIa, Dimension 5000 AFM microscope (Digital Instruments, Santa Barbara) ranging from 500 nm to 5 um. Multiple-angle spectroscopic ellipsometry (M2000) measurements were made on coatings on either PET or glass. Measurements were performed from 300 to 900 nm at an angle of incidence of 70°. Film thicknesses were determined over this range, and refractive index values were determined at 555 nm.

Contact Angle Measurement

Static water contact angle measurements were made on the dried coated samples using as-received deionized water filtered through a filtration system obtained from Millipore Corporation (Billerica, Mass.), on a video contact angle analyzer available as product number VCA-2500XE from AST Products (Billerica, Mass.). Reported values are the averages of measurements on at least three drops measured on the right and the left sides of the drops, and are shown in Table. Drop volumes were 1 μL for static measurements.

Antifogging Test

Antifogging properties were evaluated by the immediate appearance change of the coating side facing the blowing air from the alcohol-free evaluator's breath. Antifogging performance was ranked as follows:

5=Excellent

4=Good

3=poor

Durability Test

The mechanical durability was evaluated by forcibly wiping the coated surface with dry and a wet Kimwipe™ tissue as indicated in the Examples. The number reported in the Tables refers to the number of wipes required to visibly remove the coating. Light transmission was used to determine if the coating was retained or removed.

Easy Cleaning Test

A drop of dirty diesel oil, vegetable oil or soap was applied on the coating surfaces for a period of time (2 min to overnight). Subsequently, the contaminated areas were subjected to water rinsing until the dirty oil or vegetable oil was completely removed. Time consumed was recorded when the applied flow rate was set at 750 mL/min. Typically, the water rinse time is within 1 minute. Then 4-5 cleaning cycles were repeated. The cleanability was evaluated by the cleaning speed (the time) and the residual oil on the surfaces. The mechanical durability for easy cleaning was evaluated by forcibly rubbing the coating surfaces with wet Kimwipe™ tissue.

In the following Comparative Example and Examples 1-5, a corona-treated polyethylene terephthalate (PET) substrate was coated with the indicated 5 wt. % nanoparticle silica compositions at a pH of 2-3 and at a coating thickness of 1 mil (~25 micrometers) and dried at 80-100 C for 5-10 minutes. The coated samples were tested for mechanical durability and transmittivity increase using the previously described test methods. The results are shown in Table 1. For comparative purposes, a sample using 93 nm silica was also tested. From the test results in was concluded that the smaller particle sizes show improved durability

TABLE 1

| Example | SiO$_2$ nanoparticle dispersion | Mechanical Durability # wipes - dry/wet | Δ transmittivity at 550 nm (%) |
|---|---|---|---|
| Comparative 1 | 93 nm | 1/1 | 5.5 |
| 1 | 45 nm | 1/1 | 4.5 |
| 2 | 20 nm | 2/2 | 5.3 |
| 3 | 5 nm | 11/>30 | 4.2 |
| 4 | Mixed 45 nm/ 20 nm in 1:1 ratio | 1/1 | 4.7 |
| 5 | Mixed 45 nm/5 nm in 1:1 ratio | 6/>15 | 4.5 |

In the following Examples 6-8, an untreated polyethylene terephthalate substrate was coated and tested as previously described. The aqueous acidified dispersions of 45 nm or greater particle sizes were not readily coatable on this substrate.

TABLE 2

| Example | SiO$_2$ nanoparticle-dispersion | Mechanical Durability # wipes - dry/wet | Δ transmittivity at 550 nm (%) |
|---|---|---|---|
| 6 | 5 nm particles | 6/>20 | 4.5 |
| 7 | Mixed 45 nm/20 nm in 1:1 ratio | 1/1 | 4.5 |
| 8 | Mixed 45 nm/5 nm in 1:1 ratio | 4/>10 | 4.4 |

In the following Examples 9-20, a corona-treated polyethylene terephthalate substrate was coated with the indicated 5 wt. % nanoparticle silica compositions at a pH of 2-3 and at a coating thickness of 1 mil (~25 micrometers) and dried at 110-120° C. for 5-10 minutes. Some Examples further contained tetraethoxysilane (TEOS) in the indicated proportion. The coated samples were tested as previously described. From the test results it is concluded that the addition of tetraethoxysilane improves the durability of the coatings.

TABLE 3

| Example | SiO$_2$ nanoparticle-dispersion | Mechanical Durability # wipes - wet/dry | Δ transmittivity at 550 nm (%) |
|---|---|---|---|
| 9 | 100% 45 nm nanoparticles | 1/1 | 5.2 |
| 10 | 90% 45 nm nanoparticles, 10% TEOS | 4/4 | 5.1 |
| 11 | 70% 45 nm nanoparticles, 30% TEOS | 7/200 | 5.0 |
| 12 | 50% 45 nm nanoparticles, 50% TEOS | 12/200 | 4.9 |
| 13 | 100% 20 nm nanoparticles | 2/2 | 5.3 |
| 14 | 90% 20 nm nanoparticles, 10% TEOS | 6/200 | 4.7 |
| 15 | 70% 20 nm nanoparticles, 30% TEOS | 10/200 | 2.2 |
| 16 | 50% 20 nm nanoparticles, 50% TEOS | 15/200 | 2.5 |
| 17 | 100% 5 nm nanoparticles | 5/30 | 4.2 |
| 18 | 90% 5 nm nanoparticles, 10% TEOS | 8/200 | 4.7 |
| 19 | 70% 5 nm nanoparticles, 30% TEOS | 12/200 | 4.4 |
| 20 | 50% 5 nm nanoparticles, 50% TEOS | 18/200 | 5.0 |

In the following Examples 21-28, a corona-treated polyethylene terephthalate substrate was coated with the indicated 5 wt. % mixed nanoparticle silica compositions (containing a mixture of different sizes) at a pH of 2-3 and at a coating thickness of 1 mil (~25 micrometers) and dried at 110-120° C. for 5-10 minutes. Some Examples further contained tetraethoxysilanes (TEOS) in the indicated proportion. The coated samples were tested as previously described. From the test results, it is concluded that TEOS improves the durability in mixed-particle systems.

TABLE 4

| Example | SiO$_2$ nanoparticle dispersion | Mechanical Durability # wipes - dry/wet | Δ transmittivity at 550 nm (%) |
|---|---|---|---|
| 21 | 50% 45 nm, 50% 20 nm nanoparticles | 1/1 | 5.3 |
| 22 | 45% 20 nm 45% 45 nm nanoparticles, 10% TEOS | 6/60 | 5.9 |
| 23 | 35% 20 nm 35% 45 nm nanoparticles, 30% TEOS | 12/200 | 4.5 |
| 24 | 25% 20 nm 25% 45 nm nanoparticles, 50% TEOS | 15/200 | 2.5 |
| 25 | 50% 45 nm 50% 5 nm nanoparticles | 5/15 | 4.2 |
| 26 | 45% 5 nm) 45% 45 nm nanoparticles, 10% TEOS | 6/200 | 6.2 |
| 27 | 35% 5 nm, 35% 45 nm nanoparticles, 30% TEOS | 9/200 | 4.6 |
| 28 | 25% 5 nm 25% 45 nm nanoparticles, 50% TEOS | 13/200 | 3.1 |

In the following Examples 29-32, a untreated polyethylene terephthalate substrate was coated with the indicated 5 wt. % nanoparticle silica compositions at a pH of 2-3 and at a coating thickness of 1 mil (~25 micrometers) and dried at 110-120° C. for 5-10 minutes. The composition further contained tetraethoxysilanes (TEOS) in the indicated proportion. The coated samples were tested as previously described. From the test results it is concluded that tetralkoxysilane improves coating durability on untreated PET.

TABLE 5

| Example | SiO$_2$ nanoparticle dispersion | Mechanical Durability # wipes - dry/wet | Δ transmittivity at 550 nm (%) |
|---|---|---|---|
| 29 | 100% 5 nm nanoparticles | 6/>30 | 3.5 |
| 30 | 90% 5 nm nanoparticles, 10% TEOS | 7/200 | 5.0 |
| 31 | 70% 5 nm nanoparticles, 30% TEOS | 10/200 | 4.0 |
| 32 | 50% 5 nm nanoparticles, 50% TEOS | 18/200 | 3.5 |

In the following Examples 33-40, a untreated polyethylene terephthalate substrate was coated with the indicated 5 wt. % mixed nanoparticle silica compositions (containing a mixture of different sizes) at the indicated pH and at a coating thickness of 1 mil (~25 micrometers) and dried at 80-100° C. for 5-10 minutes. The composition further contained tetraethoxysilanes (TEOS) in the indicated proportion. The coated samples were tested as previously described. From the test results it is concluded that tetralkoxysilane improves coating durability of mixed particle compositions on untreated PET.

TABLE 6

| Example | SiO$_2$ nanoparticle dispersion | Mechanical Durability Coating peeled off after x time strong rubs with a dry Kimwipe, and y time strong rubs with wet Kimwipe (x/y) | Δ transmittivity at 550 nm (%) |
|---|---|---|---|
| 33 | 50% 45 nm nanoparticles, 50% 20 nm nanoparticles | 1/1 | 4.5 |
| 34 | 45% 20 nm nanoparticles, 45% 45 nm nanoparticles, 10% TEOS | 4/12 | 5.1 |
| 35 | 35% 20 nm nanoparticles, 35% 45 nm nanoparticles, 30% TEOS | 8/200 | 4.8 |
| 36 | 25% 20 nm nanoparticles, 25% 45 nm nanoparticles, 50% TEOS | 12/200 | 3.1 |
| 37 | 50% 45 nm nanoparticles, 50% 5 nm nanoparticles | 2/4 | 4.4 |
| 38 | 45% 5 nm nanoparticles, 45% 45 nm nanoparticles, 10% TEOS | 4/150 | 6.2 |
| 39 | 35% 5 nm nanoparticles, 35% 45 nm nanoparticles, 30% TEOS | 7/200 | 3.7 |
| 40 | 25% 5 nm nanoparticles, 25% 45 nm nanoparticles, 50% TEOS | 10/200 | 3.5 |

In the following Examples 41-42, an untreated polyethylene terephthalate substrate was coated with the indicated 5 wt. % mixed nanoparticle silica compositions at a pH of 2-3 and at a coating thickness of 1 mil (~25 micrometers) and dried at at 80-100° C. for 5-10 minutes. The Examples compare the performance from an aqueous dispersion vs. an ethanolic dispersion. The mechanical durability was tested with a wet Kimwipe only. The comparative example illustrates the poor performance when the ethanol is not acidified.

TABLE 7

| Example | SiO$_2$ nanoparticle-dispersion | Mechanical Durability |
|---|---|---|
| 41 | 5 nm silica nanoparticles, 5 wt % aqueous dispersion | /20 |
| 42 | 5 nm silica nanoparticles, (5 wt % in 71% ethanol) | /5 |
| Compar. Example 2 | 5 nm silica nanoparticles, (5 wt % in 71% ethanol) | /2 |

In the following Examples and Comparative Examples, the pH dependence of the coating performance was examined. In the Comparative Examples, the nanoparticles were coated as basic dispersions. The coating performance was then compared to dispersions where the pH was adjusted to 2-3, and then compared to dispersion where the pH of the acidic dispersions was again adjusted to pH 5-6 prior to coating. Each dispersion had 5 wt % nanoparticles as indicated in Table 8. The substrate was untreated PET. Dispersions that provided a visually uniform coating are designated "coatable". Coatings that beaded up and/or provided a visually non-uniform coating were designated "beading". Examples of nanoparticle emulsions having mixed sizes are also provided. These Examples demonstrate the effect of acidification on coatability and retained coatability upon readjustment of pH.

TABLE 8

| Example | SiO$_2$ nanoparticle dispersion | Initial pH | Acidified pH | Readjusted pH | Coating performance |
|---|---|---|---|---|---|
| Comparative 3 | 4 nm nanoparticles | 10 | n/a | n/a | beading |
| 43 | 4 nm | 10 | 1-3 | n/a | coatable |
| 44 | 4 nm | 10 | 1-3 | 5-6 | coatable |
| Comp 4 | 5 nm | 10 | / | / | beading |
| 45 | 5 nm | 10 | 1-3 | n/a | coatable |
| 46 | 5 nm | 10 | 1-3 | 5-6 | coatable |
| Comp 5 | 20 nm | 10 | n/a | n/a | beading |
| 47 | 20 nm | 10 | 1-3 | n/a | coatable |
| 48 | 20 nm | 10 | 1-3 | 5-6 | coatable |
| Comp 6 | 45 nm | 10 | n/a | n/a | beading |
| 49 | 45 nm | 10 | 1-3 | n/a | beading |
| 50 | 4 nm/45 nm in 1:1 | 10 | 1-3 | n/a | coatable |

TABLE 8-continued

| Example | SiO$_2$ nanoparticle dispersion | Initial pH | Acidified pH | Readjusted pH | Coating performance |
|---|---|---|---|---|---|
| 51 | 4 nm/45 nm in 1:9 | 10 | 1-3 | n/a | coatable |
| 52 | 5 nm/45 nm in 1:1 | 10 | 1-3 | n/a | coatable |
| 53 | 5 nm/45 nm in 1:9 | 10 | 1-3 | n/a | coatable |
| 54 | 4 nm/93 nm in 1:1 | 10 | 1-3 | n/a | coatable |
| 55 | 4 nm/93 nm in 1:9 | 10 | 1-3 | n/a | coatable |
| 56 | 5 nm/93 nm in 1:1 | 10 | 1-3 | n/a | coatable |
| 57 | 5 nm/93 nm in 1:9 | 10 | 1-3 | n/a | coatable |

In Examples 58-63 and Comparative Examples 7-8 an untreated polyethylene terephthalate substrate was coated with the indicated 5 wt. % nanoparticle silica compositions at the indicated pH, at a coating thickness of 1 mil (~25 micrometers) and dried at 110-120° C. for 5-10 minutes. Example 59, 60, 62 and 63 contained the surfactant SIPONATE™ DS-10 from Rhone-Poulenc, Inc. in a 98:2 silica to surfactant ratio. The static water contact angle, the transmittivity and the antifogging performance are reported. These examples demonstrate the effect of pH on coatability and on coating performance.

TABLE 9

| Example | SiO$_2$ nanoparticle dispersion | pH | Coating Quality | Water Contact Angle | Δ transmittivity at 550 nm (%) | Antifogging Performance |
|---|---|---|---|---|---|---|
| Comp 7 | 4 nm in water alcohol 70:30 by weight | 10 | Very poor many defects and pinholes | 18.4 | 2.10 | 3 |
| 58 | 4 nm, aqueous | 2-3 | Very good | 10.0 | 4.95 | 4 |
| 59 | 4 nm/DS-10 in 98:2 aqueous | 2-3 | Very good | 5.2 | 4.90 | 5 |
| 60 | 4 nm/DS-10 in 95:5 aqueous | 2-3 | Very good | 5.4 | 4.90 | 5 |
| Comp 8 | 5 nm water/alcohol in 30/70 ratio by | 10 | Very poor, many defects, many pinholes | 14.5 | 2.30 | 3 |
| 61 | 5 nm aqueous | 2-3 | Very good | 9.2 | 5.02 | 4 |
| 62 | 5 nm/DS-10 98:2 aqueous | 2-3 | Very good | 5.3 | 4.98 | 5 |
| 63 | 5 nm/DS-10 95:5 aqueous solution | 2-3 | Very good | 4.6 | 4.90 | 5 |

In the following Examples 64-82 and Comparative Examples 9-14 an untreated polyethylene terephthalate substrate was coated with the indicated 5 wt. % nanoparticle silica compositions at the indicated pH, at a coating thickness of 1 mil (~25 micrometers) and dried at 110-120° C. for 5-10 minutes. The water advancing and receding contact angles are reported. In Example 84, the substrate was a polycarbonate having a perfluoropolyether coating, prepared according to Example 1 of Ser. No. 11/828,566 (Klun et al, incorporated herein by reference), using as the top coating a solution of SHC-1200 containing 0.5 weight percent of Preparation 2. In Example 85, the substrate was an anhydride modified polyethylene polymer sold under the tradename Bynel™ and commercially available from E. I. DuPont de Nemours & Co., Wilmington, Del. Stable means no gelation in at least 2 months. These examples demonstrate that dispersion stability and coatability is related to pH and to particle size.

TABLE 10

| Example | SiO$_2$ nanoparticle-dispersion | Substrate | pH | Contact angle Adv/Rec (°) | Shelf life of dispersion solution | Coatability |
|---|---|---|---|---|---|---|
| Comp 9 | Deionized water only | PET | 7 | 74.0/63.0 | n/a | beading |

TABLE 10-continued

| Example | SiO₂ nanoparticle-dispersion | Substrate | pH | Contact angle Adv/Rec (°) | Shelf life of dispersion solution | Coatability |
|---|---|---|---|---|---|---|
| Comp 10 | 5 nm | " | 10.5 | 72.1/61.5 | stable | coatable |
| 64 | 5 nm | " | 2 | 72.5/21.9 | stable | coatable |
| 65 | 5 nm | " | 3 | 70.7/23.7 | gelled after 7 days | coatable |
| 66 | 5 nm | " | 4 | 71.9/20.0 | Gelled after 5 days | coatable |
| 67 | 5 nm | " | 5 | 72.1/19.0 | Gelled after 6 days | coatable |
| Comp 11 | 4 nm | " | 9.5 | 72.2/55.5 | Stable | beading |
| 68 | 4 nm | " | 2 | 75.0/21.5 | Stable | coatable |
| 69 | 4 nm | " | 3 | | Gelled after 24 hrs | coatable |
| 70 | 4 nm | " | 4 | 75.1/27.6 | Gelled after 2 days | coatable |
| 71 | 4 nm | " | 5 | 74.2/22.6 | Gelled after 24 hrs | coatable |
| 72 | 13 nm | " | 2 | 80.4/21.2 | Stable | coatable |
| 73 | 13 nm | " | 3 | 79.8/22.1 | Stable | coatable |
| 74 | 13 nm | " | 4 | 80.9/40.1 | Stable | beading |
| 75 | 13 nm | " | 5 | 81.1/55.7 | Stable | beading |
| 76 | 13 nm | " | 6 | 79.8/57.3 | Stable | beading |
| Comp 12 | 20 nm | " | 9.5 | 77.9/54.4 | Stable | beading |
| 78 | 20 nm | " | 2 | 79.6/19.4 | Stable | coatable |
| 79 | 20 nm | " | 3 | | Stable | coatable |
| 80 | 20 nm | " | 4 | 80.5/25.5 | Stable | coatable |
| Comp 13 | 20 nm | " | 5 | 79.2/44.6 | Stable | beading |
| Comp 14 | 20 nm | " | 6 | 79.9/55.9 | Stable | beading |
| 81 | 5 nm | Polycarbonate | 2 | 88.1/31.1 | Stable | coatable |
| 82 | 5 nm | Polyurethane | 2 | 104.8/24.2 | stable | caotable |
| 83 | 5 nm | PVC | 2 | 70.2/23.2 | stable | coatable |
| 84 | 5 nm | PFPE on PC | 2 | 109.2/24.3 | Stable | coatable |
| 85 | 5 nm | Bynel | 2 | 80.2/30.3 | Stable | coatable |

In the following Examples 86-89 an untreated polyethylene terephthalate substrate was coated with the indicated 5 wt. % nanoparticle silica compositions at pH 2-3, at a coating thickness of 1 mil (~25 micrometers) and dried at 110-120° C. for 5-10 minutes. The initial transmittivity was measured then the sample was subjected to "wet rub" of 100 rubs with a wet paper towel to determine durability, and the transmittivity was again measured. In addition the antifogging properties were measured. In Examples 87 and 89 the DS-10 surfactant was added. Antifogging was further evaluated by aging for at least 11 days at 50° and 95% humidity. The examples demonstrate that surfactants do not significantly impair coating performance and improves antifogging performance.

TABLE 11

| Example | SiO₂ nanoparticle dispersion | Transmittivity initial % | Transmittivity final % | Antifogging aging at 50° C. and 95% humidity |
|---|---|---|---|---|
| 86 | 4 nm | 91.87 | 91.70 | Good initial antifogging, but slightly fog after 22 hrs |
| 87 | 4 nm/DS-10 in 95:5 ratio | 91.56 | 91.40 | Excellent antifogging after 11-20 days |
| 88 | 5 nm | 91.87 | 91.70 | Good initial antifogging, but slightly fog after 22 hrs |
| 89 | 5 nm/DS-10 in 95:5 ratio | 91.56 | 91.40 | Excellent antifogging after 11-20 days |

In the following Examples 90-93 and Comparative Examples 15-16 ceramic tiles were coated with the indicated 5 wt. % nanoparticle silica compositions at the indicated pH, at a coating thickness of 1 mil (~25 micrometers) and dried at 110-120° C. for 5-10 minutes. Rinse away cleaning for easy removal of soap scum was carried out by immersing in soup scum and subsequently successfully rinsing off the scum with a stream of water. Coating durability was evaluated by rubbing with a wet paper towel or alternatively with a dry paper towel: Measurement of light transmission was used to determine if the coating was retained or removed. Coating quality is poor if pinholes appear or if interference colors are strong and non-uniform.

TABLE 12

| Example | Type of SiO$_2$ nanoparticle dispersion | pH | Coating Quality | Easy removal of soap scum | Mechanical durability wet paper towel (#wipes) |
|---|---|---|---|---|---|
| 90 | 4 nm in aqueous solution | 2-3 | Very good | Residual soap scum | 150 |
| Comp 15 | 4 nm/DS-10 in 95/5 ratio aqueous solution | 10 | Poor | | 40 |
| 91 | 4 nm/DS-10 in 95/5 ratio aqueous solution | 2-3 | Very good | Very clean | 120 Improved durability |
| 92 | 5 nm/DS-10 in 95/5 aqueous solution | 2-3 | Very good | Very clean | 100 Improved durability |
| Comp 16 | 5 nm/DS-10 in 95/5 ratio aqueous solution | 10 | Poor uniformity | | 30 |
| 93 | 5 nm aqueous solution | 2-3 | Very good | Residual soap scum | 120 |

In the following Example 94 and Comparative Example 17 an untreated polyethylene terephthalate substrate was coated with the indicated 5 wt. % nanoparticle silica compositions at the indicated pH, at a coating thickness of 1 mil (~25 micrometers) and dried at 110-120° C. for 5-10 minutes. Rinse away cleaning for easy removal of oil was carried out by applying a few drops of oil onto the coated samples and subsequently successfully rinsing off the oil with a narrow stream of water at a speed of 750 mL/min. Coating durability was evaluated by rubbing with a wet paper towel or alternatively with a dry paper towel: Measurement of light transmission was used to determine if the coating retained or come off.

TABLE 13

| | Type of SiO$_2$ nanoparticle dispersion | pH | Easy removal of food oil | Easy removal of dirty diesel oil |
|---|---|---|---|---|
| 94 | 5 nm | 2-3 | Completely removed | Completely removal remained |
| Comp 17 | None | n/a | remained | remained |

Figure 3:
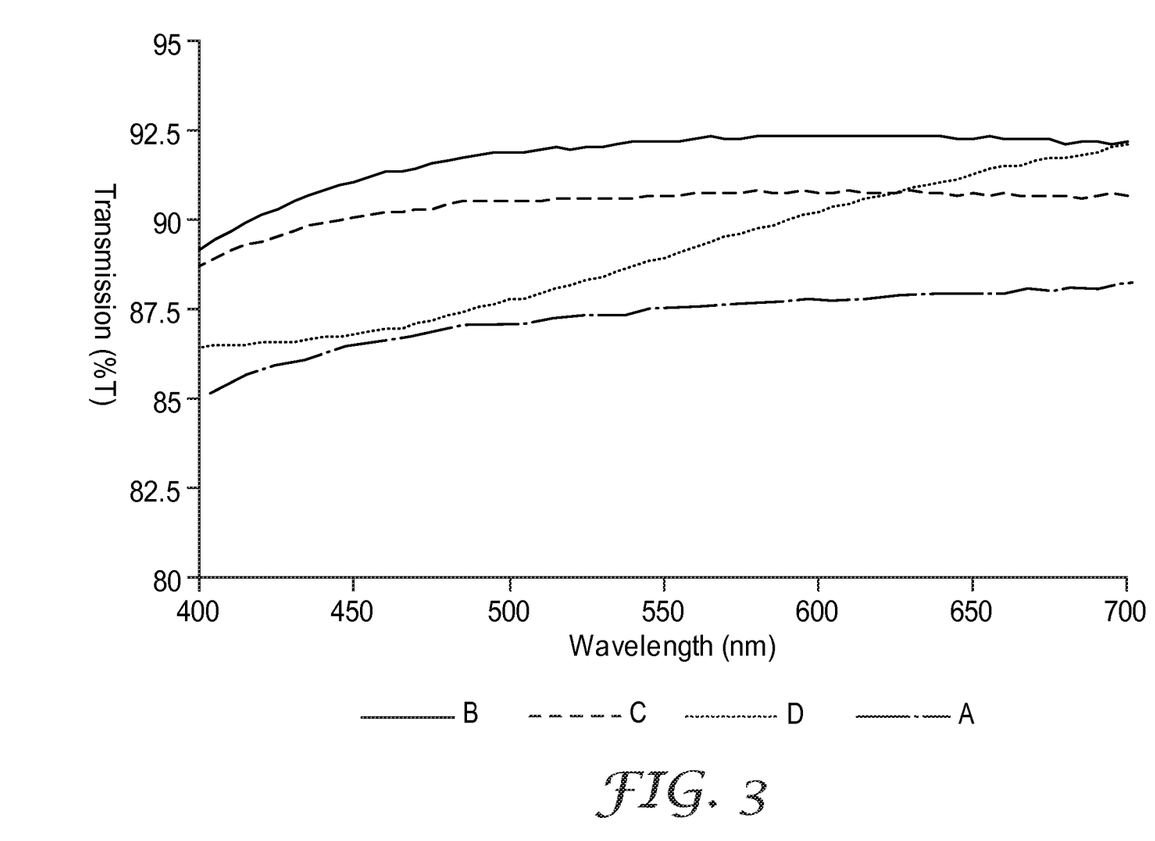
FIGS. 3 to 5 graph the transmissivity of articles of the invention.
Figure 4:
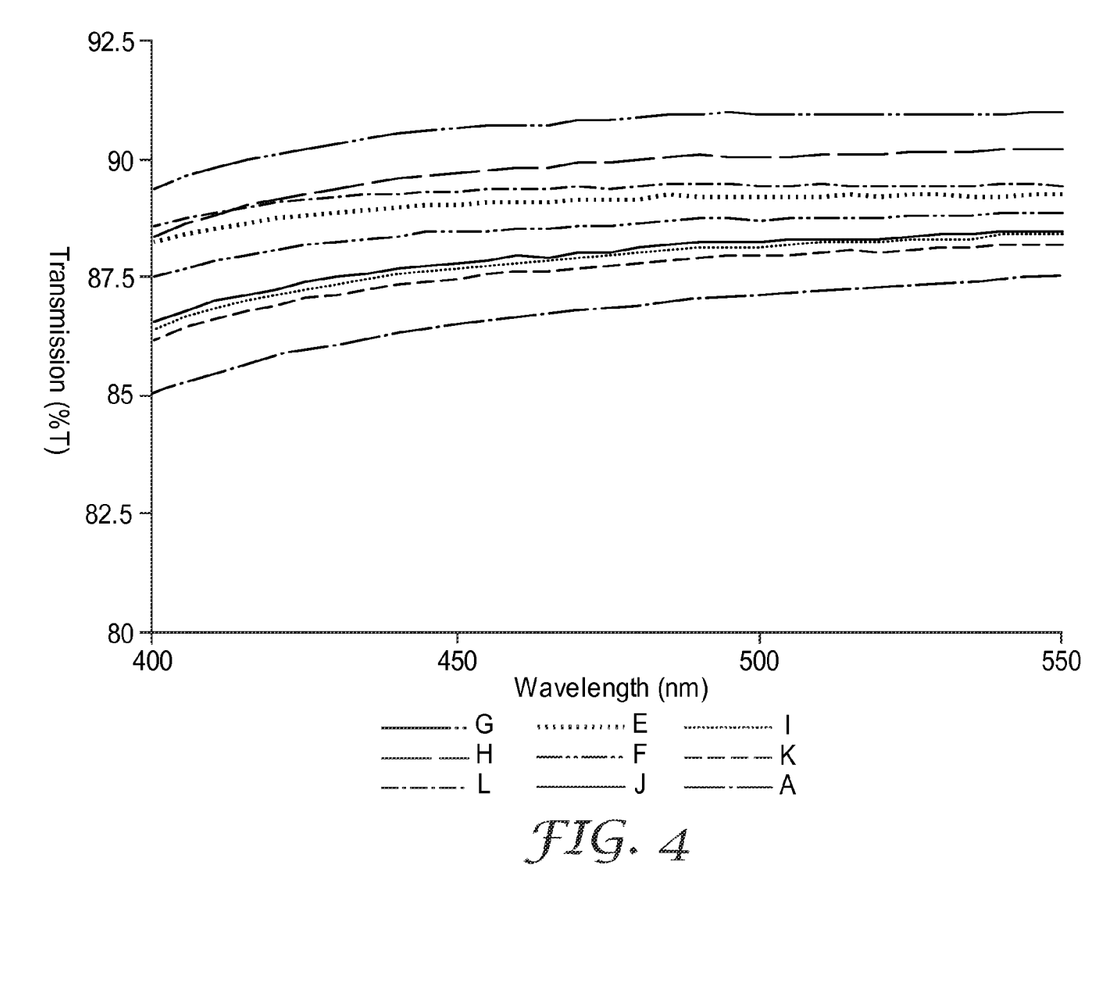
Figure 5:
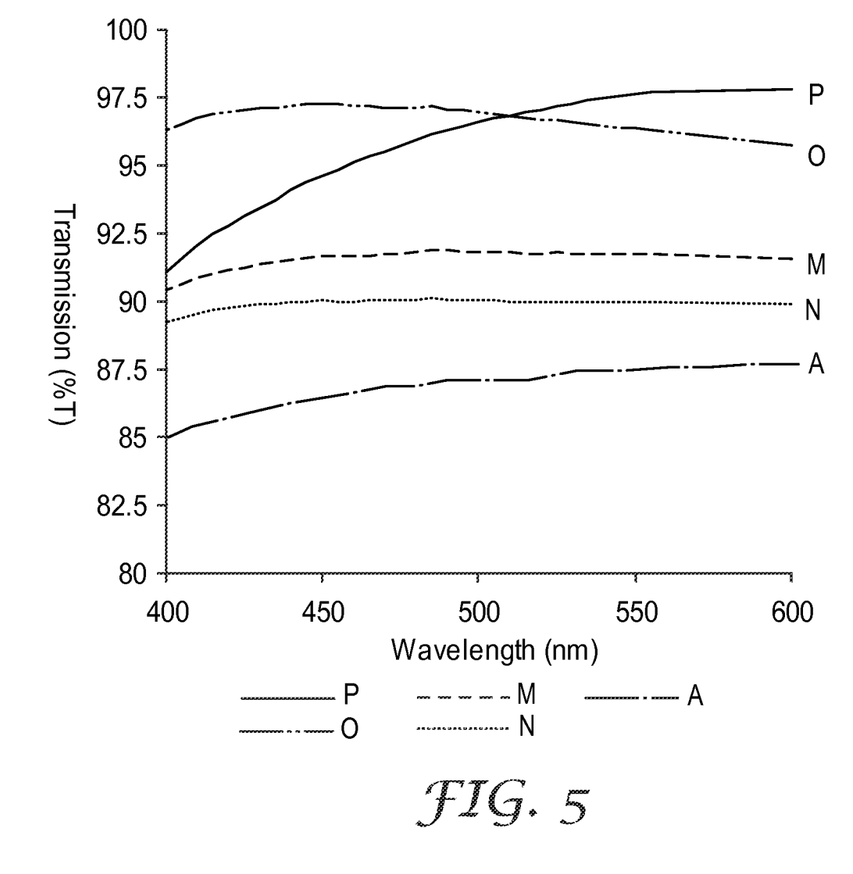

In FIGS. 3-5, the transmittance of the coated articles was measured. The articles were prepared essentially as described in Example 1 using a polyethylene terephthalate (PET) film substrate.

In FIG. 3, the samples were as follows:
A polyethylene terephthalate (PET) film as a control
B 5 wt % aqueous dispersion of 5 nm silica at pH 2
C 5 wt % ethanolic dispersion of 5 nm silica at pH 2.
D 5 wt % ethanolic dispersion of 5 nm silica at pH 10.

As can be seen in FIG. 3, samples B and C exhibited much greater transmittivity than the uncoated PET sample A. Sample D, coated at basic pH did not exhibit the increases of either of samples B and C at wavelengths of 350 to 600 nanometers.

In FIG. 4, the samples were as follows:
A polyethylene terephthalate (PET) film as a control
E 5 wt % aqueous dispersion of 5 nm/45 nm mixture (10:90) at pH 2
F 5 wt % ethanolic dispersion of 5 nm/45 nm mixture (10:90) at pH 2
G 5 wt % aqueous dispersion of 5 nm/90 nm mixture (10:90) at pH 2
H 5 wt % ethanolic dispersion of 5 nm/90 nm mixture (10:90) at pH 2
I 5 wt % ethanolic dispersion of 5 nm/90 nm mixture (10:90) at pH 10
J 5 wt % ethanolic dispersion of 90 nm at pH 2
K 5 wt % ethanolic dispersion of 90 nm at pH 10
L 5 wt % ethanolic dispersion of 45 nm at pH 2
In FIG. 5, the samples were as follows:
A polyethylene terephthalate (PET) film as a control
M 5 wt % aqueous dispersion of 4 nm/45 nm mixture (ratio?) at pH 2, single side coated
N 5 wt % aqueous dispersion of 4 nm at pH 2, single side coated
O 5 wt % aqueous dispersion of 4 nm/45 nm mixture (ratio?) at pH 2, double side coated
P 5 wt % aqueous dispersion of 4 nm, pH 2, double side coated As can be seen by comparing samples M and O, or N and P, the transmissivity of the substrates can be greatly improved by coating both sides of the substrate film.

What is claimed is:
1. A method of providing a coating to a substrate comprising providing a coating composition consisting of:
   a) 0.5 to 99 wt. % water
   b) 0.1 to 20 wt. % silica nanoparticles having an average particle diameter of 40 nm or less,
   c) 0 to 20 wt. % silica nanoparticles having an average particle diameter of 50 nm or more, wherein the sum of b) and c) is 0.1 to 20 wt. %;
   d) a sufficient amount of an acid having a pKa of <3.5 to reduce the pH to less than 5;
   e) 0 to 20 percent by weight of a tetraalkoxysilane, relative to the amount of the silica nanoparticle;
   wherein the sum of the weight percents of components a) to e) is 100 wt. % of the coating composition;

contacting a substrate with the coating composition consisting of a) to e) is 100 wt. % of the coating composition;
contacting a substrate with the coating composition consisting of a) to e);
and drying to provide a silica nanoparticle coating.

2. The method of claim 1 wherein the substrate is a hydrophobic substrate having a static water contact angle of greater than 50°.

3. The method of claim 1, where the aqueous dispersion of silica nanoparticles additionally comprises silica nanoparticle having average particle diameters greater than 40 nanometers.

4. The method of claim 1 wherein the acid is selected from oxalic acid, citric acid, $H_3PO_4$, HCl, HBr, HI, $HBrO_3$, $HNO_3$, $HClO_4$, $H_2SO_4$, $CH_3SO_3H$, $CF_3CO_2H$, and $CH_3SO_2OH$.

5. The method of claim 1 wherein the silica nanoparticles b) have average particle diameters of 20 nanometers or less.

6. The method of claim 1 wherein the silica nanoparticles b) have average particle diameters of 10 nanometers or less.

7. The method of claim 1, wherein the substrate has a static water contact angle of less than 50° after coating.

8. The method of claim 1 wherein the pH of the coating composition is less than 3.

9. The method of claim 1 comprising the steps of adding sufficient acid to adjust the pH of the coating composition to less than 5, then adding sufficient base to adjust the pH to the range of 5 to 6.

10. The methos of claim 1 wherein the coating composition contains no added organic solvent.

* * * * *

UNITED STATES PATENT AND TRADEMARK OFFICE
CERTIFICATE OF CORRECTION

| | | |
|---|---|---|
| PATENT NO. | : 9,556,338 B2 | Page 1 of 1 |
| APPLICATION NO. | : 12/988663 | |
| DATED | : January 31, 2017 | |
| INVENTOR(S) | : Naiyong Jing | |

It is certified that error appears in the above-identified patent and that said Letters Patent is hereby corrected as shown below:

In the Specification

Column 1,
Line 11, delete "its/theeir" and insert -- its/their --, therefor.

In the Claims

Column 22,
Line 64, in Claim 1, delete "0" and insert -- 0.1 --, therefor.

Column 23,
Line 16, in Claim 4, after "$CH_3SO_3H$," insert -- $CF_3SO_3H$, --.
Line 30, in Claim 10, delete "methos" and insert -- method --, therefor.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*